R. LAPHAM.
Device for Setting and Skimming Milk.
No. 207,664.  Patented Sept. 3, 1878.
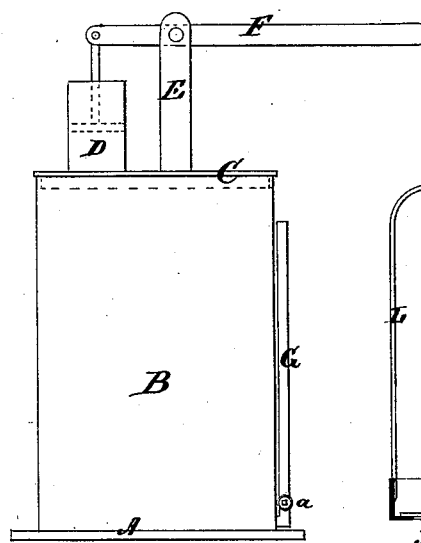
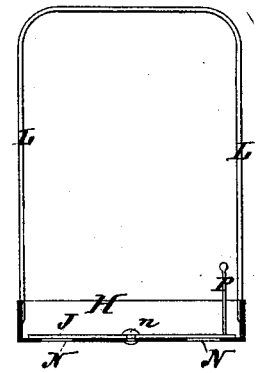
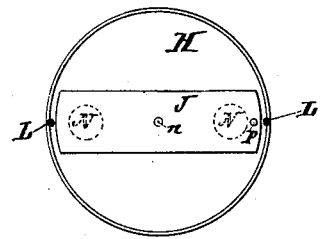
Witnesses.
Henry E Rauder
William Ehret.
Inventor
Rufus Lapham
N. PETERS, PHOTO-LITHOGRAPHER, WASHINGTON, D.C.

UNITED STATES PATENT OFFICE.

RUFUS LAPHAM, OF NEW YORK, N. Y.

IMPROVEMENT IN DEVICES FOR SETTING AND SKIMMING MILK.

Specification forming part of Letters Patent No. 207,664, dated September 3, 1878; application filed December 8, 1877.

*To all whom it may concern:*

Be it known that I, RUFUS LAPHAM, of the city, county, and State of New York, have made certain Improvements in Methods of Setting Milk for Raising Cream and Skimming the same, a full description of which is seen in the following specification and accompanying drawings, with letters of reference marked thereon.

The nature of my invention consists in setting milk for raising cream in large deep vessels, holding, say, from ten to one hundred gallons, and made of sufficient strength and tightness to sustain a vacuum, or nearly a vacuum, which I produce by means of an air-pump connected therewith, or by any of the known ways. By this vacuum the creamy portion of the milk becomes expanded and lighter, and will rise, therefore, far more rapidly and entirely to the surface, even though several feet in depth, while the watery portion, which is about eighty-five per cent. of pure milk, and about ninety-seven per cent. of our city milk, will remain unchanged. In this way I make one simple vessel take the place of many milk-pans, and the pantry, which must be in a cool place, as by the side of spring water, or in a cool cellar, else the milk will soon turn sour, thereby stopping all further rising of the cream. It is estimated by experienced dairymen that from ten to twenty per cent. of the cream often is lost in this way, however great the care taken may be, while in a vacuum the milk will remain sweet any length of time, and hence the vessel may be placed anywhere, even in the kitchen, open sun, or cow-yard, if need be, and, being perfectly tight, the cream will be free from all dust and dirt.

My skimmer I place in the vessel before the milk is strained in, and there it remains at the bottom during the rising of the cream, and is so constructed with holes and a cut-off that on being lifted the milk will pass through till the cream is reached, which is indicated by a pin on the cut-off first appearing above the cream, and by this pin the cut-off is made, so that the cream then may be lifted and let out into a bowl or pan placed upon the vessel.

By this simple apparatus nine-tenths at least of the arduous labor of the dairy-maid is saved. Even a boy can take perfect care of the milk of several hundred cows; and, besides, the cream having been held in a vacuum for several hours can be churned in less than half the time, and the product will be the most perfect.

Having spoken of the nature and utility of my invention, I will proceed to describe it more fully by reference to the drawings.

In Figure I, B represents the vessel—say, thirty-six inches in height and eighteen inches in diameter, capable of holding thirty gallons and more—made of wood or any other suitable material, A being the bottom or platform; C, the cover; D, the air-pump, attached to the cover, with its necessary valves unseen. G is a tube extending up above the surface of the milk in the vessel when filled, and is for the purpose of letting in the air at the bottom of the vessel to supply the vacuum, when required, and to conduct air of any desired temperature up through the milk. $a$ is a cock, to let in or shut out air, as required.

Fig. II represents my skimmer entire, being made in cup form, of sufficient capacity to hold the cream, and just fitting the vessel B. In the bottom of this cream-vessel H are two or more holes, N N. J is a cut-off, turning on a center, $n$, and of a width to well cover the holes N N, and to leave them open when turned off. P is a pin or handle, attached to the cut-off J, by which it is turned as desired. This pin, passing up through the cream first of all, serves also to indicate when and where the cut-off should be made. To this cream-vessel also are attached rods or arms L L, reaching up above the cream, by which the skimmer is lifted and handled.

Fig. III is a front view of the skimmer, as seen looking down into it, the cut-off J covering the holes N N. Other devices—such as a float-glass inlet into the vessel, &c.—may serve to indicate where to cut off.

The operation is very simple. I first put the skimmer, Fig. II, into the vessel B. I then put on a strainer and strain in pail after pail full till the vessel is about three-fourths filled. I then put on the cover C, which fits air-tight by means of a rubber packing or flap. I then pump out the air by the pump D till I get nearly a vacuum. In this condition the apparatus remains till the cream has all risen, and when that has been accomplished I open the cock *a* and let the vessel fill with air. The cover then can easily be removed. I then slowly lift or wind up the skimmer till I see the pin P appear above the cream. I then turn the cut-off J till it completely covers the holes N N. I then continue to wind up the skimmer till I can shove a bowl or pan beneath it. I then turn back the cut-off and let the cream into the bowl, ready to leap into butter by being slightly agitated. I then draw off the milk in the vessel B by means of a cock at the bottom of the vessel. I then dash in a pail or two of cold water, or warm water if at hand, and so wash the vessel from all sediment that may have collected and not been removed by letting out the milk, and then the apparatus is ready for another milking, and so on.

Between the vessel B and air-pump D there should be a stop-cock, to aid in holding a vacuum; and the pump may be attached to the side of the vessel B, or elsewhere, at convenience.

The pipe G may connect with a refrigerator, so that cold air may be drawn through the milk at pleasure, entering at the bottom of the vessel, under the skimmer, which will tend to distribute the air evenly through the milk.

The vessel B may be made in any desirable form, like a barrel or otherwise; but I prefer to make it of wood, of sufficient thickness to allow the ends of the vessel to be shaved or turned down, so that hoops may be firmly driven on, while the inside of the vessel will have an equal diameter the whole depth.

What I claim, and desire to secure by Letters Patent, is—

1. In combination with the vacuum-vessel B, the lifting-skimmer H, provided with the cut-off J, and rods or arms L, or their equivalents, substantially as described, and for the purpose set forth.

2. The air-tube G, in combination with the vacuum-vessel B, through which tube the air is drawn in by suction over the surface of the milk, substantially as described, and for the purpose set forth.

3. The lifting-skimmer H, provided with a cut-off, J, for the purpose set forth.

RUFUS LAPHAM.

Witnesses:
WM. A. POWELSON,
R. B. YARWOOD.